United States Patent Office 3,436,124
Patented Apr. 1, 1969

3,436,124
TREATMENT OF GRANULAR, CRUSHED,
POWDERED OR LIKE MATERIALS
Harry Smith, Heap Cottage, 174 Bury Old Road, Heywood, Lancashire, England, and James W. Wootton-Davies, Green Bank, Green St., Walshaw, near Bury, Lancashire, England
Filed May 19, 1967, Ser. No. 639,817
Claims priority, application Great Britain, May 21, 1966, 22,744/66
Int. Cl. B65g 53/14, 53/60; F26b 17/10
U.S. Cl. 302—36                    2 Claims

ABSTRACT OF THE DISCLOSURE

The method and apparatus for treating granular, crushed or powdered materials, wherein the material is introduced into a duct through which a high velocity gas stream is moving, the material being placed in suspension in said gas stream and being treated and simultaneously conveyed to a discharge area where it is separated from said gas stream.

---

Figure 1:
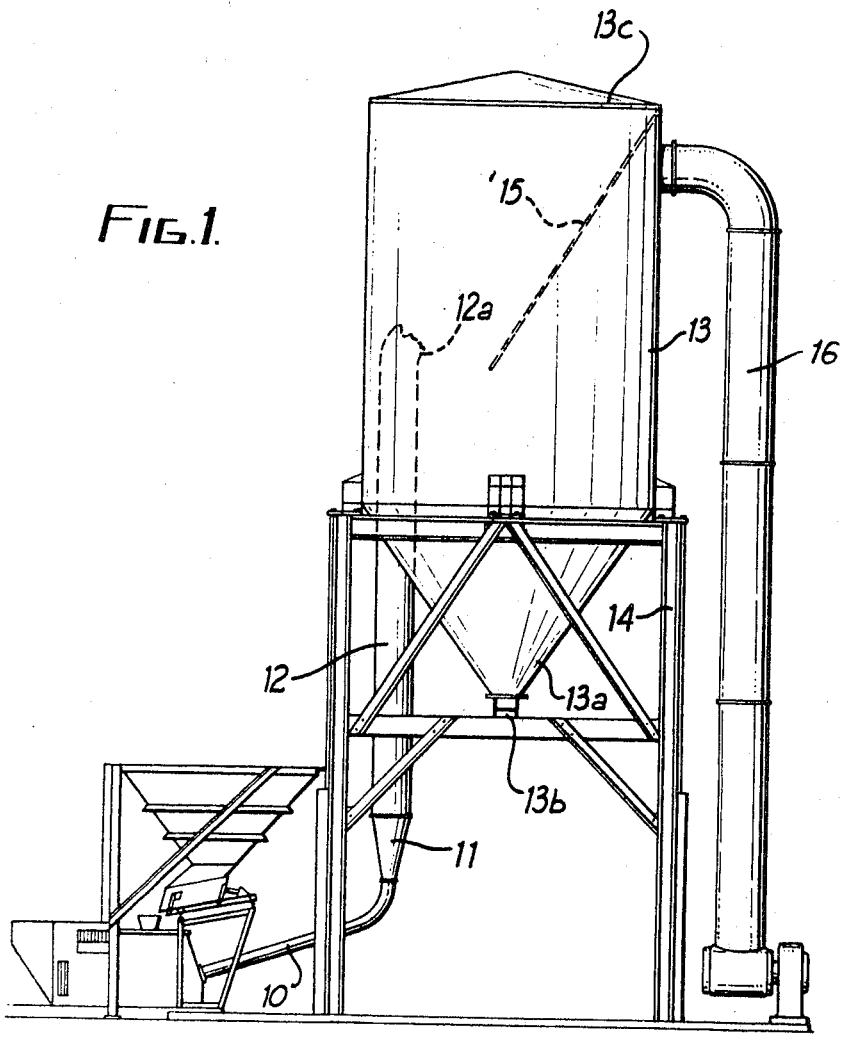

This invention relates to the treatment of granular, crushed, powdered or like materials and is particularly, though not exclusively, applicable to the conveying, drying and classification of materials such as sand or gravel or road-making aggregates which have a natural and variable moisture content. Such aggregates include granite chippings of the order of ¾ inch mesh.

One of the problems of treating such materials as sand or gravel arises directly from its natural water content, whether such treatment is to be effected at the quarry site or after delivery to a consumer, since such moisture content makes it more difficult to convey, screen or grade the material and hinders any other treatment, such as coating it with some other material.

A typical known method of treating road-making aggregates for drying the same is as follows:

Sand and chippings, still relatively wet, are shovelled in appropriate quantities into a large rotating downwardly inclined drying drum, often 5 ft. diameter and up to 30 feet in length, fired internally by naked oil or gas flame and fan-induced cold air flow, the material travelling meantime along the drum to fall out of the far end. A dust extractor at such far end removes the "fines" of the calibre passing a 200 mesh. From there the dried mixture of sand and chippings is elevated, still hot, by bucket chain up to a screen, for grading, to be collected in hoppers from where it is weigh-batched, reheated and mixed with bitumen or other binder.

It is also known by apparatus known as a "fluidised bed" dried to dry sand. In such apparatus fan-blown heated air is caused to pass up through a bed of the material supported on a perforated member. The sand is fed on to such member at one end and is moved as if "fluid" towards an outlet at the other end by the pressure of fresh incoming material. Such a bed of material may be of the order of 12 inches or so in thickness. The heated air forced up through the bed of material and making it behave like a fluid, is led off, moisture laden, to a cyclone separator for the extraction of dust or other "fines" therefrom before being discharged to atmosphere.

The present invention is based on the appreciation of the possibility of treating and conveying such materials, with or without classification, in a more simple and efficient manner than heretofore, by using the high velocity hot exhaust gasses of a jet or turbojet engine, with or without afterburner heating.

One object of the present invention is an improved method of and apparatus for effecting such operation of treating and conveying said materials.

A further problem is that of introducing the material, in its basic form, into the draught tunnel for suspension in the hot gaseous stream, and a further object of the present invention is to provide material-introducing means to meet the aforesaid further problem.

A further object of the present invention is an improved method of and apparatus for meeting the aforesaid further problem.

The invention comprises the method of treating and conveying granular, crushed, powdered or like material as herein defined consisting in the steps of directing the exhaust gases of a jet or turbojet engine into one end of a duct to provide a high velocity hot draught therein, feeding the said material into the said duct so that it is put into suspension in said draught so as simultaneously to convey and treat the material in said duct and separating the said material from said exhaust draught at the other end of said duct.

According to a first feature of the present invention apparatus for treating and conveying granular, crushed powdered or like materials, with or without classification, comprises a draught tunnel adapted at one end to receive the exhaust gases from a jet or turbojet engine, and means for delivering the material to the interior of the draught tunnel in such manner that it enters into suspension in the said exhaust gases, and means at the other end of said draught tunnel for separating the material from the conveying draught.

The expression "treating and conveying" is used herein to define the bringing of the material into suspension in the gaseous medium of the moving hot exhaust gases while treating such suspended and moving material so as to effect a physical and/or a chemical change. A physical change includes for example change of temperature, drying, classifying, grading and the mixing together of different solid materials such as sand and cement or sand and chippings or the mixing together of solid, gaseous and liquid materials, all while in suspension and whether effected severally or in any combination. A chemical change would include the mixing with one material of at least one reagent, whether solid, gaseous or liquid and whether the reaction is immediately initiated as a result of such mixing or is delayed until some other necessary condition is satisfied. The expression granular, powdered, crushed or like materials is used herein to include particulate, disseminated or disseminable material such as peat, grass or other vegetable matter for treating and conveying the same as above defined.

According to a second feature of the invention, means for introducing into a draught tunnel material capable of being suspended and treated in a hot gaseous stream therein comprises a relatively inclined combined baffle and material-supporting member in said draught tunnel so as to deflect and thereby compress and accelerate the flowing gases to pass therearound, means for feeding the said material continuously onto said member, means such as apertures in said member for the introduction of part of said gaseous stream against the underside of the material moving down the inclined member and over the surface of each member, thereby to initiate gaseous suspension of said material on said member before entering the said deflected hot gaseous stream to complete its suspension therein.

Figure 2:
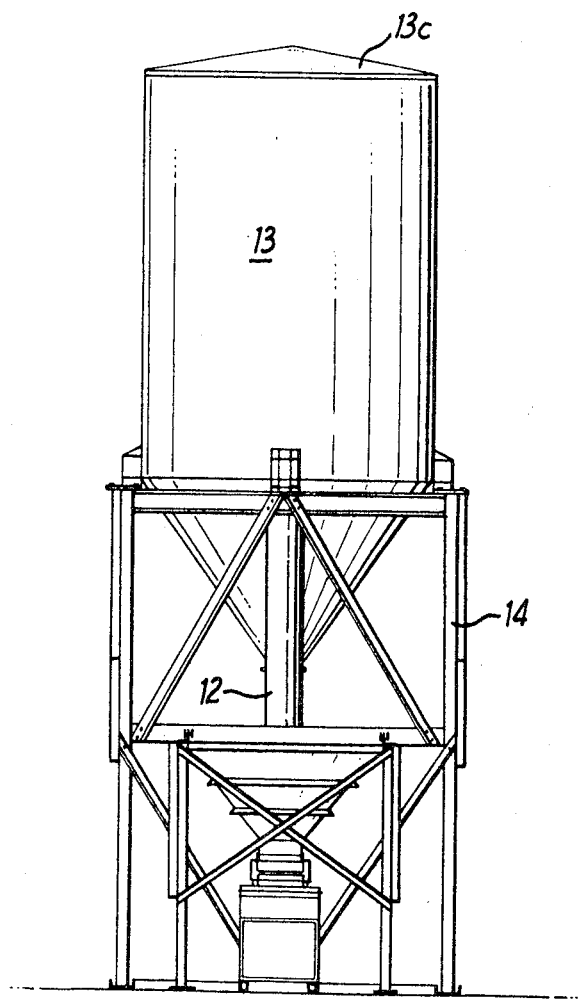
Figure 4:
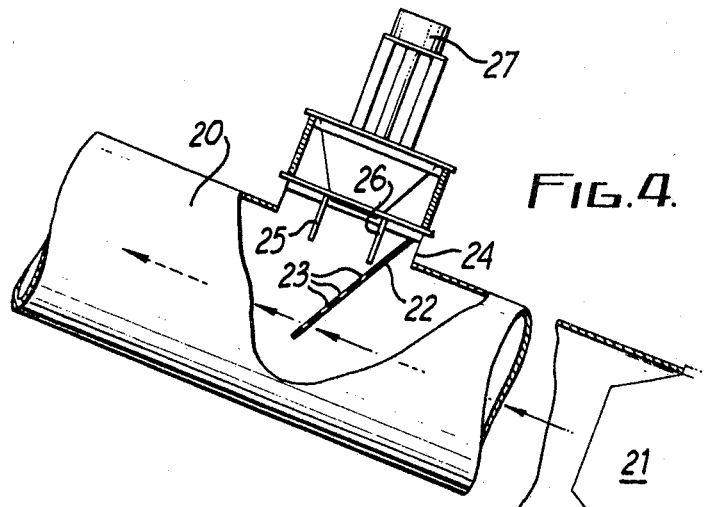
Figure 3:
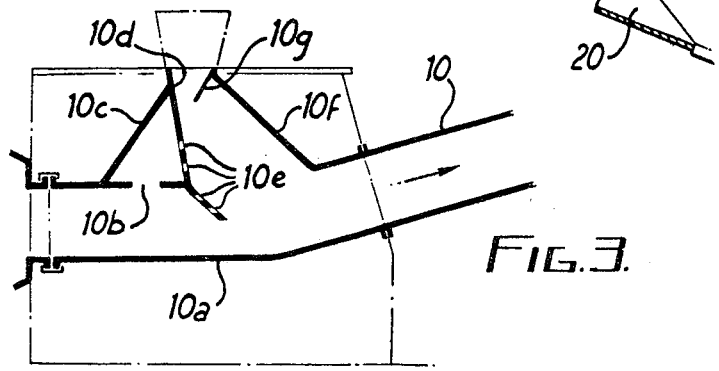
Figure 5:
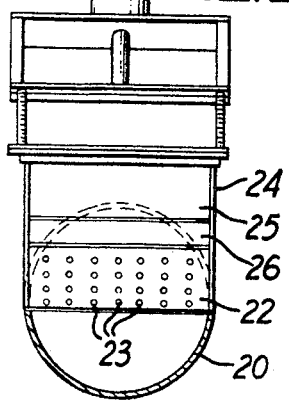
Figure 6:
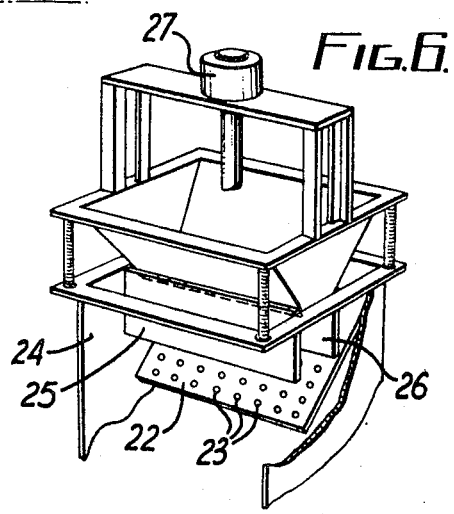

In the accompanying drawings:
FIG. 1 is a side elevation, and
FIG. 2 is an end view of one example of apparatus made in accordance with the present invention;
FIG. 3 is a fragmentary diagram showing the lower end of the draught tube of FIGS. 1 and 2;
FIGS. 4, 5 and 6 are fragmentary views showing an alternative arrangement for the introduction of material into the draught tube.

As shown in FIGS. 1, 2 and 3 the apparatus comprises an upwardly inclined draught tube 10 the lower end of which is connected to the exhaust outlet of a gas turbine engine. The engine shown is that made by the Rover Car Co. Ltd. of Coventry, England, and a suitable size of draught tube for such engine is 9 inches diameter. The other end of the tube is bent to an easy curvature and connected thereto is a conical piece 11, in turn connected to an upright extension 12 of 18 inches diameter. Such extension 12 enters the upper portion of a hopper 13 supported on a frame 14 and is bent as shown at 12a at its upper end. In the hopper 13 is an inclined baffle 15 to separate off an upper part thereof, into which the material-laden exhaust discharges before entering the lower conical end 13a having an open outlet 13b. Connected to the upper part of the hopper behind the baffle 15 is a dust-extractor unit 16 of any known kind so proportioned as to be capable of maintaining an overall partial vacuum in the hopper, which latter is provided with a cover 13c.

The material is adapted to be fed to the draught tube by means shown in FIGS. 4, 5 and 6 as described later or by the construction as shown in detail in FIG. 3 in which, at the lower end of the inclined draught tube 10 there is a horizontal portion 10a in the upper part of which is a hole 10b covered by a hood 10c, at the front of which is an inclined closure plate 10d extending down into the horizontal portion 10a forming a material-receiving, guiding and supporting plate in which is provided a plurality of small air holes 10e. Forward of said plate is a further forwardly inclined plate 10f which in combination with side plates not shown forms a funnel-like entry to the draught tube, partially restricted by an inclined bent upper portion 10g of the plate 10f forming a deflector on to which the material is adapted to be fed by means of a conveyor belt or vibrator feed at an adjustable rate.

In operation, after starting the turbojet engine to establish the hot exhaust draught in the system and the dust extractor to establish a partial vacuum in the hopper 13, the material feed is started to deliver the material, such as wet sand, so that it falls on to the deflector 10g and passes down against or just in front of the plate 10d. The lower end of such plate provides a slight resistance so that some of the draught passes through the hole 10b and through the upper holes 10e while also passing through the lower holes 10e as air jets which act to break up balled or coagulated masses of sand and prevent their adhesion to the plate, as well as initiating suspension of the sand etc. in the hot draught medium, so that when it enters the main portion of the draught below the lower end of the plate 10d, such material, however wet it may be is whipped away in suspension therein at high velocity. On reaching the conical section 11 the sand etc. is already partially dried by the evaporating action of the hot exhaust gases and its speed is allowed to reduce and its area to spread before entering the riser 12, where the drying continues while the draught is sufficient to lift the dried product, still in suspension, and to discharge it into the angle between the baffle 15 and the cover 13c. The dried sand, etc., falls out of suspension into the lower part of the hopper from whence it may be allowed to fall out, or where it may be temporarily held by means of a shutter while a transport vehicle is being moved into or out of position below the outlet 13b. Preferably means are provided for automatically stopping the material feed in the event of failure of the exhaust draught.

As shown in FIGS. 4, 5 and 6 the means for introduction of the material tube 20 forming a draught tunnel of 8 inches diameter and some 60 feet in length, the upper end being inclined to about 25 degrees so that its upper end is about 30 feet above the ground. In the lower end of the tube which part only is shown is the exhaust nozzle 21 of a jet engine made by the Rover Company for vehicle propulsion, such nozzle being of 5 inches diameter. Located in the said draught tunnel is a baffle member 22 at an inclination of about 60 degrees to the axis thereof and provided with a plurality of apertures 23, the lower end of the plate being some 3½ inches from the bottom of the tunnel thus reducing the area of the tunnel to about the same as that of the engine exhaust and located about 4 feet therefrom. The size, location and number of the apertures may have to be varied according to the material to be handled. Above the pipe is a rectangular box-like structure 24, the inclined baffle 22 forming part of the bottom thereof. Such structure includes plates 25, 26 to guide the material on to the baffle 22 down a chute of 8" x 3" in cross section, the lower end of the trailing plate viewed in the direction of flow of the gaseous stream, being some 2½ inches from the baffle. Above such chute is a tundish having an outlet of 7" by 2¼" dimension to feed into said chute and resiliently mounted for mechanical vibration by a vibrator 27.

In operation, the material to be treated such as sand or gravel may be delivered by a mechanical elevator to the tundish from which it will feed into the chute and on to the baffle plate by which it may be temporarily supported. The engine being already started will be maintaining high velocity of flow of exhaust gases in the draught tunnel 20, some of which will be passing through the apertures 23 in the baffle 22 which will initiate suspension of the material as it moves down over the surface of the baffle. Consequently, such material will be initiated into suspension in the gases and will enter the fast flowing gaseous stream in the draught tunnel so as to be carried along the tunnel in a state of suspension to be ejected from the upper end thereof. The material so ejected will be automatically graded in size, the larger particles falling out of the gaseous stream beyond the smaller particles, and collecting means may be constructed to take advantage of this automatic grading, thus avoiding the mechanical screening operation usually required for such purpose. The dimensions of the tundish outlet, relative to the clearance between the trailing plate and the baffle are intended to prevent any obstruction lodging at such latter position. The dimensions, number and location of the apertures in the baffle, which apertures are preferably given a directional inclination will depend to some extent on the nature and initial condition of the material to be treated.

So far as has been ascertained by experiments made to date, the apparatus shows a substantial saving in fuel consumption, compared with previously known methods and apparatus for the drying, conveying and grading of materials and is both smaller in size and easier to control.

In a modification (not shown) the means for introducing the material my be tube-like, instead of being plate-like and flat, with the end of such tube projecting into the tunnel and on the downstream or trailing side bevelled-off so that the rush of the gaseous stream around such end will induce suspension of the material as it is exposed thereto when it reaches this bevelled-off end. This arrangement has exhibited some degree of success with quarry materials, but better results were obtained with the arrangement described above in more detail. The use of a venturi for the induction of the material was tried but showed certain difficulties and was not proceeded with, though such a device is not excluded as a means of introduction for the material into the draught tunnel, any more than other possible mechanical means.

The apparatus of the present invention is applicable to other uses than those above described. For example, in many industrial processes it is required to remove volatiles from solid materials while conveying them, or to mix and blend solids where a high temperature is an advantage, and the apparatus aforesaid would lend itself especially to such other uses. The draught tube could also provide a chamber for continuous processing where this can be advantageously effected in a hot exhaust draught. The apparatus has been found to be capable of handling granite chippings of the order of ¾ inch mesh which can be delivered dry and also heated ready for immediate tarring for use as road surfacing material. Also the apparatus may be used or installed for the handling and removal of "fly ash" from furnaces and the like, and also has been used experimentally and with promise for the drying of peat.

One major advantage of the improved method of, and apparatus for, the conveying and treating of materials is that the heat energy of the exhaust draught is mainly employed in evaporating moisture from the material which, surprisingly enough, is delivered in a relatively cool condition, i.e., at temperatures which permit of handling with the bare hands. Where however a higher delivery temperature is required this can be obtained by fitting an after burner to the engine exhaust and/or elsewhere along the draught tube and the temperature may thereby be raised for example to consume unwanted combustible vegetable matter.

The turbine exhaust may be closely mounted relative to the material introduction structure to prevent induction of air at that point, or loosely mounted to permit induction of air to increase the draught volume.

We claim:

1. Apparatus for treating and conveying particulate or powdered material, comprising a duct through which a high velocity gas stream is moving, means communicating with said duct at one end thereof for introducing said velocity gas stream thereto, means for delivering said material into said duct, including a receiving aperture and a baffle member located adjacent the aperture and being partially positioned in said duct, said baffle member having perforations fromed therein which provide for a passage of a portion of said gas therethrough, the arrangement being such that the material is placed in suspension in said high velocity gas stream, and means communicating with the other end of said duct for receiving said material as it is discharged therein by said high velocity gas stream, said baffle member being formed with additional perforations located adjacent to said duct and in communication therewith, but outside the confines thereof, and means for directing a portion of the gas stream to said additional perforations for promoting suspension of said material in said gas stream, and means for separating said material from said high velocity gas stream.

2. Apparatus as set forth in claim 1, conveyor means for conveying said material at a controlled rate to said aperture in said delivering means.

References Cited

UNITED STATES PATENTS

| 466,685 | 1/1892 | Hodnett et al. | 302—36 |
| 1,243,892 | 10/1917 | Strong | 302—36 |
| 1,892,233 | 12/1932 | Chappell | 34—10 X |
| 1,912,910 | 6/1933 | Neuman et al. | 34—10 X |
| 2,054,441 | 9/1936 | Peebles | 34—10 X |
| 2,318,576 | 5/1943 | Arnold | 34—10 X |
| 2,511,970 | 6/1950 | Cox | 34—10 |

FOREIGN PATENTS 209,602  1/1924  Great Britain.

CHARLES J. MYHRE, *Primary Examiner.*

R. A. DUA, *Assistant Examiner.*

U.S. Cl. XR

34—57